(No Model.)
S. W. UNDERHILL.
BRICK KILN.
No. 306,195.  Patented Oct. 7, 1884.
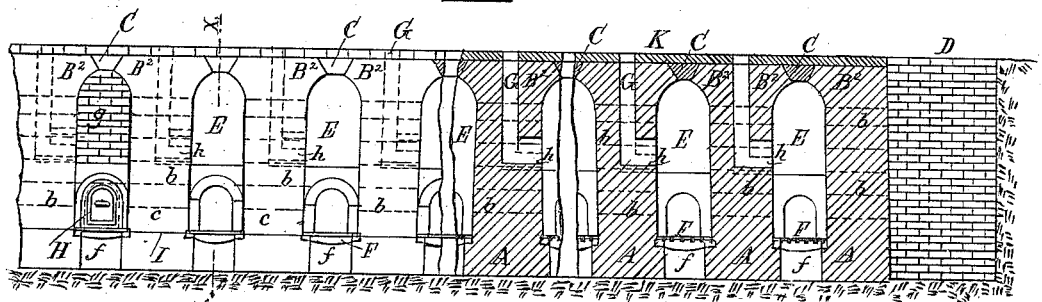
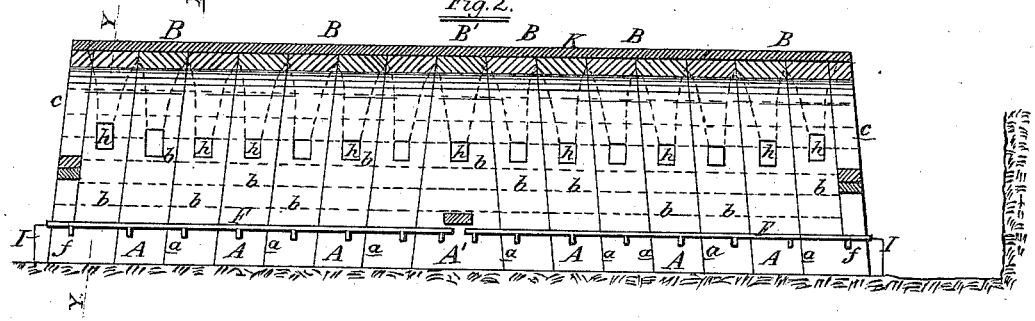
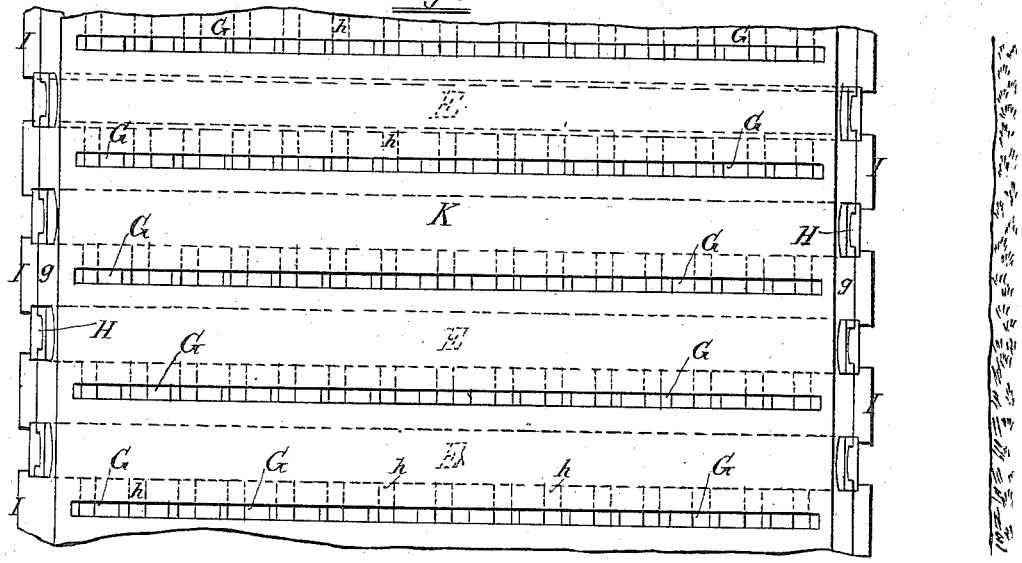
WITNESSES
Henry Stewart
Henry C. Folger.
INVENTOR
Stephen W. Underhill.
BY
Iran S. Storer
ATTORNEY.

United States Patent Office.

STEPHEN W. UNDERHILL, OF CROTON POINT, NEW YORK.

BRICK-KILN.

SPECIFICATION forming part of Letters Patent No. 306,195, dated October 7, 1884.

Application filed June 20, 1883. Renewed March 25, 1884. (No model.)

*To all whom it may concern:*

Be it known that I, STEPHEN W. UNDERHILL, a citizen of the United States of North America, and a resident of Croton Point, county of Westchester, State of New York, have invented a new and useful Improvement in Brick-Kilns, of which the following is a specification.

This invention is designed as an improvement on the brick-kiln for which United States Letters Patent No. 202,489 were issued to me April 16, 1878; and its object is to secure economy of construction and durability and a more even distribution of heat in the kiln, whereby the bricks will be more evenly burned.

The invention consists in constructing the permanent base of a brick-kiln of fire-brick material molded *in situ* by means of suitable removable molds or forms; and, further, in constructing and locating certain of the hot-air flues so as to better direct the heat toward the sides of the kiln; and the invention applies especially to what is known as a "permanent base" of a brick-kiln—that is, a system of furnaces, flues, and reservoirs permanently constructed to support the pile of unburned bricks, in contradistinction to the ordinary arrangement of such bricks for the purpose of burning them.

Reference is to be had to the accompanying drawings, forming part of this specification, in which similar letters of reference indicate corresponding parts in all the figures.

Figure 1 is a front elevation of my improved kiln-base, partly in section, on line *y y*, Fig. 2. Fig. 2 is a sectional side elevation of the same on line *x x*, Fig. 1. Fig. 3 is a plan of a portion of the kiln-base.

This kiln-base, instead of being built up of burned brick, is constructed, preferably, of fire-brick materials molded in place—that is, a suitable foundation, preferably of common red brick, is laid, and upon this are placed molds or forms made of boards open at top and bottom. Then the fire-clay or brick material, properly mixed and tempered, is filled into said molds or forms and pressed down sufficiently to make a solid mass. Left for a certain time, the contents of the molds or forms become sufficiently dry and firm to permit the safe removal of the boards that form the molds. The boards or molds being removed, the blocks molded or formed by and in them remain in place, forming the piers, arches, keys, and other solid permanent portions of the kiln-base, all in their proper relative positions. Each pier, arch, &c., may be molded or formed in a single block, and afterward be cut or separated *in situ* vertically or transversely, or both, into two or more blocks, as indicated in Figs. 1 and 2, wherein A A' represent, respectively, the individual piers separated from each other or molded separately, as indicated by the vertical lines *a*, and divided into blocks by molding or cutting along the dotted lines *b b;* or said piers and arches may all be molded or formed together in one mass by the use of suitable molds or frames, and be afterward divided by cutting into blocks of such sizes and shapes as may be desired in view of their subsequent positions upon expanding and contracting under the application and withdrawal of heat; or the structure may be built up from the foundation in successive layers molded in place, one layer being molded on the top of another when the latter has become sufficiently dry to support the weight. All these methods have been tested, and are practical; but ordinarily a combination of them is preferable.

In the drawings, A A' represent the piers supporting the arches B. Preferably the piers A are set inclining inward at the top from front to rear toward the central pier, A', as indicated in Fig. 2, so that when cooling and contracting after heating and expanding the said piers A shall tend to contract and lean toward a central point, instead of contracting or warping in all directions, as is usually the case with perpendicular piers; hence by thus inclining the piers A greater stability and durability of the structure are assured. The arches B are also preferably inclined from front to rear toward the central arch, B', in correspondence with the inclination of the piers A, and for the same reasons. After the blocks B², which form the flanks or springings of the arches and are molded in place, have become sufficiently set or dried, the keystones C are also molded *in situ*, and of such dimensions that on their shrinkage and the shrinkage of the contiguous parts they will become properly fitted and adjusted in place. The two ends of this kiln-base are supported by buttresses of brick, as indicated at D, Fig. 1, while the sides or inclined faces of the kiln-base are preferably covered with one or more courses of bricks, as indicated at c, Fig. 2. The vaulted passages or hot-air reservoirs E extend through from side to side of the kiln-base, and each passage reaches up from the grate-surface nearly to the upper surface of the kiln-base.

At or near the bottom of each passage E are set grates F, that extend throughout said passages, so that they may be fired from either end. Beneath the grates F are the ash-pits f.

At one side of each passage or reservoir E, about half-way above the grates F, are the ingress-openings h of a series of flues, G, which extend horizontally to about the perpendicular center of each pier A A', and then pass vertically upward through the top K of the kiln-base, for the purpose of conducting the heat from the reservoirs E to the bricks to be burned.

The ends of the reservoirs E at the sides of the kiln-base are designed to be walled up, as indicated at g on the left of Fig. 1, so as to leave only openings for the furnace-doors and ash-pits.

Furnace-doors H are designed to be set at each end of the reservoirs E, as shown in Fig. 1, and along the sides of the kiln-base projecting ledges I are constructed to form convenient supports for the furnace-doors when the latter are temporarily removed from their normal positions.

In my Patent No. 202,489, hereinbefore alluded to, all the ingress-openings of the flues leading from the hot-air reservoirs are shown to be placed in the same horizontal line, and are shown and were designed to be all of the same dimensions. In practice, however, it has been found that with such construction the temperature of the kiln cannot be controlled as desired in every part.

For the best working or firing of a kiln it is desirable that the heat be at first directed or thrown more toward the sides than to the center or middle of the structure, for if the center or middle be at first more highly heated than the sides the tendency is for the temperature to disproportionately increase those at the expense of that at the sides, and the result is that the central bricks are burned long before those at the sides. To obviate these objections, to throw and continue the heat at will at the sides in order to burn the bricks there equally with those at the center, I locate the extreme side ingress-openings, h, at a higher elevation than any of the others, and make them, as well as their corresponding flues, larger, as shown in Fig. 2, and the immediately contiguous ingress-openings and flues I make larger than the inner ones, as shown. By reason of this construction the draft up through the side flues may, by proper adjustment of the doors, be made greater than through any of the others, and the heat at and above these points be first directed toward the sides of the structure; and because these extreme side flues are the first to reach a comparatively high temperature, and are more capacious than the others, it is easy to maintain an almost even temperature throughout every part of the kiln. A slight excess of heat passing up through these side flues compensates for the loss by radiation through the sides of the structure and through the sides of the mass of brick piled thereon to be burned.

The firing and operative manipulation of this improved kiln-base in no other particular differs from that described in my Patent No. 202,489 above referred to; hence it is not necessary herein to repeat the description.

In practice it is found that great economies of time and labor are secured, and great durability also, by constructing all the parts of the kiln-base *in situ* of blocks of convenient dimensions or of larger blocks that are afterward cut into two or more, special care always being had to mold or cut the blocks in such shapes that they will best withstand the distorting influences of frequent heating and cooling; and it is also found that by giving the side bricks in a kiln at the beginning of the firing a start or advantage in heating over the more central bricks, and by constructing and locating the side flues especially with reference to this object, a very much larger proportion of the bricks may be properly burned, and that there will be much less waste in a kiln from imperfectly or excessively burned bricks.

Having thus described my invention, I claim as new and desire to secure by Letters Patent—

1. A brick-kiln base constructed, substantially as herein shown and described, of fire-brick materials molded *in situ* in or by means of removable forms or molds.

2. A brick-kiln base provided with series of flues leading upward from hot-air reservoirs, the end flues being larger or of greater capacity than the more central flues, substantially as and for the purposes described.

3. A brick-kiln base constructed with its extreme end flues of greater capacity than the central flues, and with their ingress-openings located on a higher level than the ingress-openings of the central flues, substantially as herein set forth, and for the purposes described.

In testimony that I claim the foregoing as my invention I have signed my name, in presence of two witnesses, this 12th day of June. 1883.

STEPHEN W. UNDERHILL.

Witnesses:
JACOB J. STORER,
ALBERT P. MORIARTY.